US006051825A

United States Patent [19]
Lindsay et al.

[11] Patent Number: 6,051,825
[45] Date of Patent: Apr. 18, 2000

[54] CONDUCTING SCANNING PROBE MICROSCOPE WITH ENVIRONMENTAL CONTROL

[75] Inventors: Stuart M. Lindsay, Phoenix; Tianwei Jing, Tempe, both of Ariz.

[73] Assignees: Molecular Imaging Corporation, Phoenix; Arizona Board of Regents, Tempe, both of Ariz.

[21] Appl. No.: 09/100,049

[22] Filed: Jun. 19, 1998

[51] Int. Cl.[7] ........................................... G01J 1/20
[52] U.S. Cl. ................ 250/201.3; 250/239; 250/559.22; 250/306
[58] Field of Search ................. 250/201.3, 239, 250/559.22, 306, 307, 222.2, 228, 234; 356/376, 244, 440

[56] References Cited

U.S. PATENT DOCUMENTS

| | | | |
|---|---|---|---|
| 5,289,004 | 2/1994 | Okada et al. | 250/306 |
| 5,440,121 | 8/1995 | Yasutake et al. | 250/306 |
| 5,468,959 | 11/1995 | Tohda et al. | 250/306 |
| 5,504,338 | 4/1996 | Marrian et al. | 250/306 |
| 5,675,154 | 10/1997 | Lindsay et al. | 250/306 |
| 5,767,514 | 6/1998 | Lloyd | 250/306 |

OTHER PUBLICATIONS

Anselmetti et al., "Combined scanning tunneling and force microscopy", J. Vac. Sci. Technol. B, vol. 12, No. 3, May/Jun. 1994, pp. 1677–1680.
Anselmetti et al, "Compact, combined scanning tunneling/force microscope", Rev. Sci. Instrum. 63 (5), May 1992, pp. 3003–3006.
Luo et al., "Rapid Communication Probing the conducting paths in a metal–insulator composite by conducting atomic force microscopy", J. Phys. D: Appl. Phys. 29 (1996), pp. 3169–3172.
Sugawara et al., "Scanning force/tunneling microscopy of a graphite surface in air", J. Vac. Sci. Technol. B, vol. 9, No. 2, Mar./Apr. 1991, pp. 1092–1095.
Salmeron et al., "Tip–surface forces during imaging by scanning tunneling microscopy", J. Vac. Sci. Techno. B 9 (2), Mar./Apr. 1991, pp. 1347–1352.
Mate et al., "Direct Measurement of Forces During Scanning Tunneling Microscope Imaging of Graphite", Surface Science 208 (1989), pp. 473–486 (month unknown).
Ono et al., "Fabrication of a Si scanning probe microscopy tip with an ultrahigh vacuum–scanning tunneling microscope/atomic force microscope", J. Vac. Sci. Technol. B 15(4), Jul./Aug. 1997, pp. 1531–1534.
Martin et al., "High–resolution capacitance measurement and potentiometry by force microscopy", Appl. Phys. Lett. 52 (13), Mar. 28, 1988, pp. 1103–1105.
O'Shea et al., "Characterization of tips for conducting atomic force microscopy", Rev. Sci. Instrum. 66 (3), Mar. 1995, pp. 2508–2512.

*Primary Examiner*—Que T. Le
*Attorney, Agent, or Firm*—Killworth, Gottman, Hagan & Schaeff, LLP

[57] ABSTRACT

A scanning probe microscope for measuring the characteristics of a surface of a sample is provided and includes a probe for scanning the surface of a sample to be measured and a sample stage which is adapted to position a sample in the microscope. In a preferred embodiment, the microscope is a conducting atomic force microscope. The microscope also includes a source of voltage in communication with the probe and the sample and a detector for measuring the electrical current to or from the probe and the sample. The probe and the sample are positioned within an enclosure which isolates the probe and the sample from the ambient environment, and the enclosure includes a gas inlet and a gas outlet for controlling the environment in the enclosure to maintain the atmosphere in the enclosure at approximately atmospheric pressure.

17 Claims, 7 Drawing Sheets

CONDUCTING SCANNING PROBE MICROSCOPE WITH ENVIRONMENTAL CONTROL

BACKGROUND OF THE INVENTION

This invention relates to scanning probe microscopy, and, more particular to a conducting scanning probe microscope for the simultaneous acquisition of electrical and topographical information about a surface.

The use of a probe for the simultaneous acquisition of electrical and topographical data has been described by several workers, including Bryant et al, "Scanning Tunneling and Atomic Force Microscopy Performed with the Same Probe in One Unit," *J. Microscopy*, 152:871–875 (1988), who used a scanning tunneling microscope to detect the deflection of a conducting probe. Others have used optical means to detect the deflection of a flexible probe. To date, most measurements of electrical properties have been carried out in ambient air, using optical detection of the deflection of a flexible force-sensing cantilever which is either made from a conducting material or coated with one.

Figure 1:
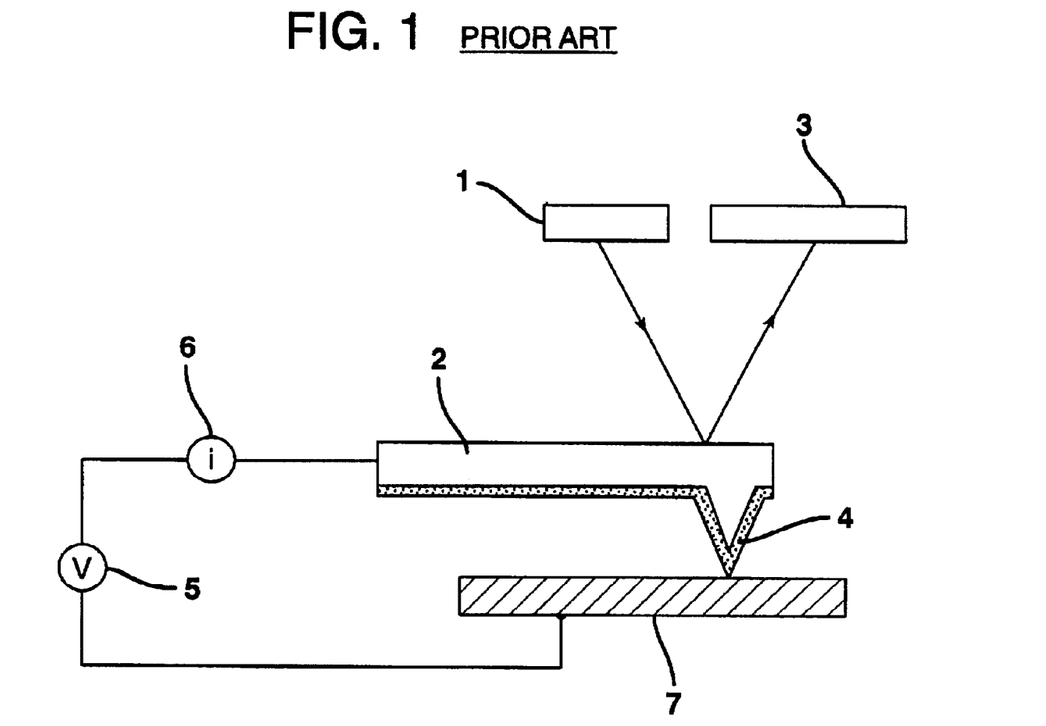
FIG. 1 is a schematic illustration of a conducting scanning probe microscope operated in ambient air according to the prior art.

As illustrated in FIG. 1, a beam of light from a laser 1 is reflected off the back of a flexible cantilever 2 and into a position sensitive detector 3. The cantilever and probe tip are coated with a conducting material 4 and a potential difference 5 is applied between the coating 4 and a conductive sample 7. A means for detecting current flow 6 is connected in series with the conductive coating 4 on the cantilever 2. The cantilever probe tip is then scanned over the surface of the sample, in contact with it, to generate a current signal indicative of the local conductivity in addition to the usual atomic force microscope image. It has been shown that the force and current vary as a surface is approached.

Figure 2:
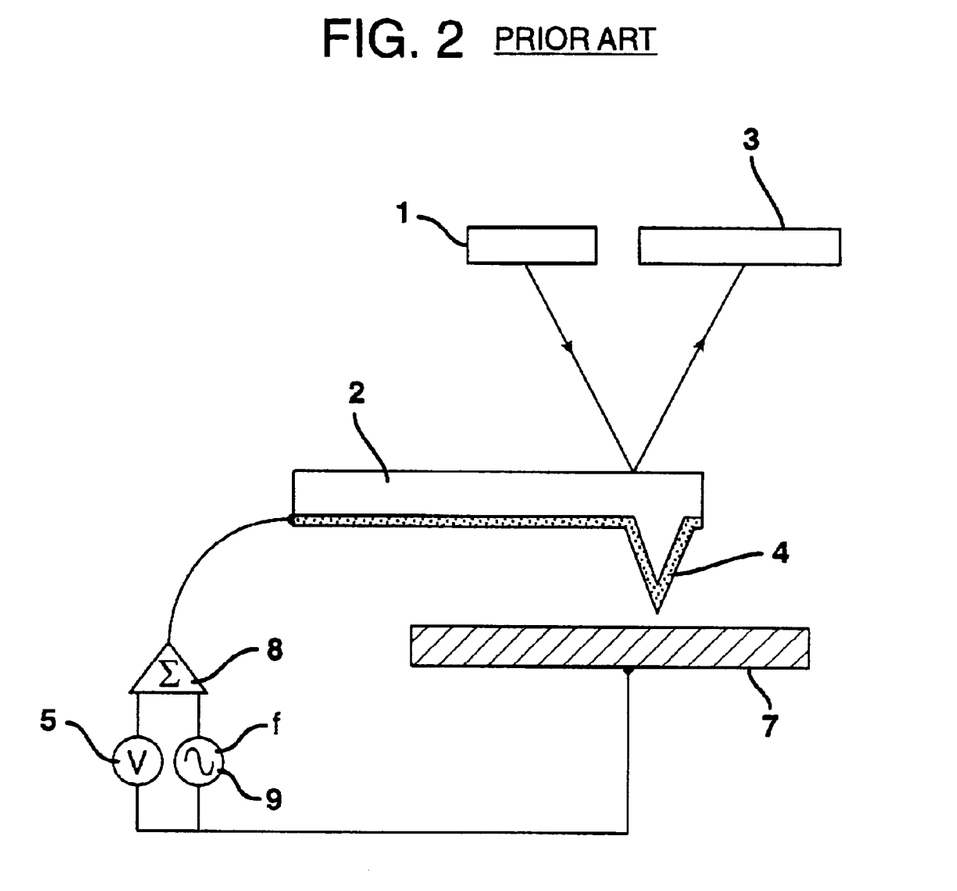
FIG. 2 is a schematic illustration of an oscillating conducting scanning probe microscope operated in ambient air according to the prior art.

Others, such as Martin et al, "High Resolution Capacitance Measurement and Potentiometry by Force Microscopy," *Appl. Phys. Lett.*, 52:1103–1105 (1988) and Yasutake et al, U.S. Pat. No. 5,440,121, have used a non-contact method to map out local capacitance or charge on a surface. This method is illustrated in FIG. 2 where, in addition to the DC voltage 5 applied between the conducting sample 7 and conducting coating 4 on a cantilever 2, an alternating voltage 9 is applied at a frequency f by means of a summing amplifier 8. This causes a fluctuation in the cantilever tip to substrate voltage which, in turn, causes the electrostatic force on the tip to vary, resulting in an oscillatory deflection of the tip at a frequency f. The magnitude of the force, F, depends on the capacitance between the tip and sample according to $$F = \frac{1}{2} V^2 \frac{dC}{dz} \quad (1)$$

where V is the voltage applied between the tip and sample, and dC/dz is the capacitance gradient between the tip and sample. In a variation of this method, Tohda et al, U.S. Pat. No. 5,468,959, described a conducting probe microscope in which the variation in the electrical force while scanning is nulled by application of an opposing magnetic force. The measurements reported to date in the art have been carried out in ambient air.

Figure 3:
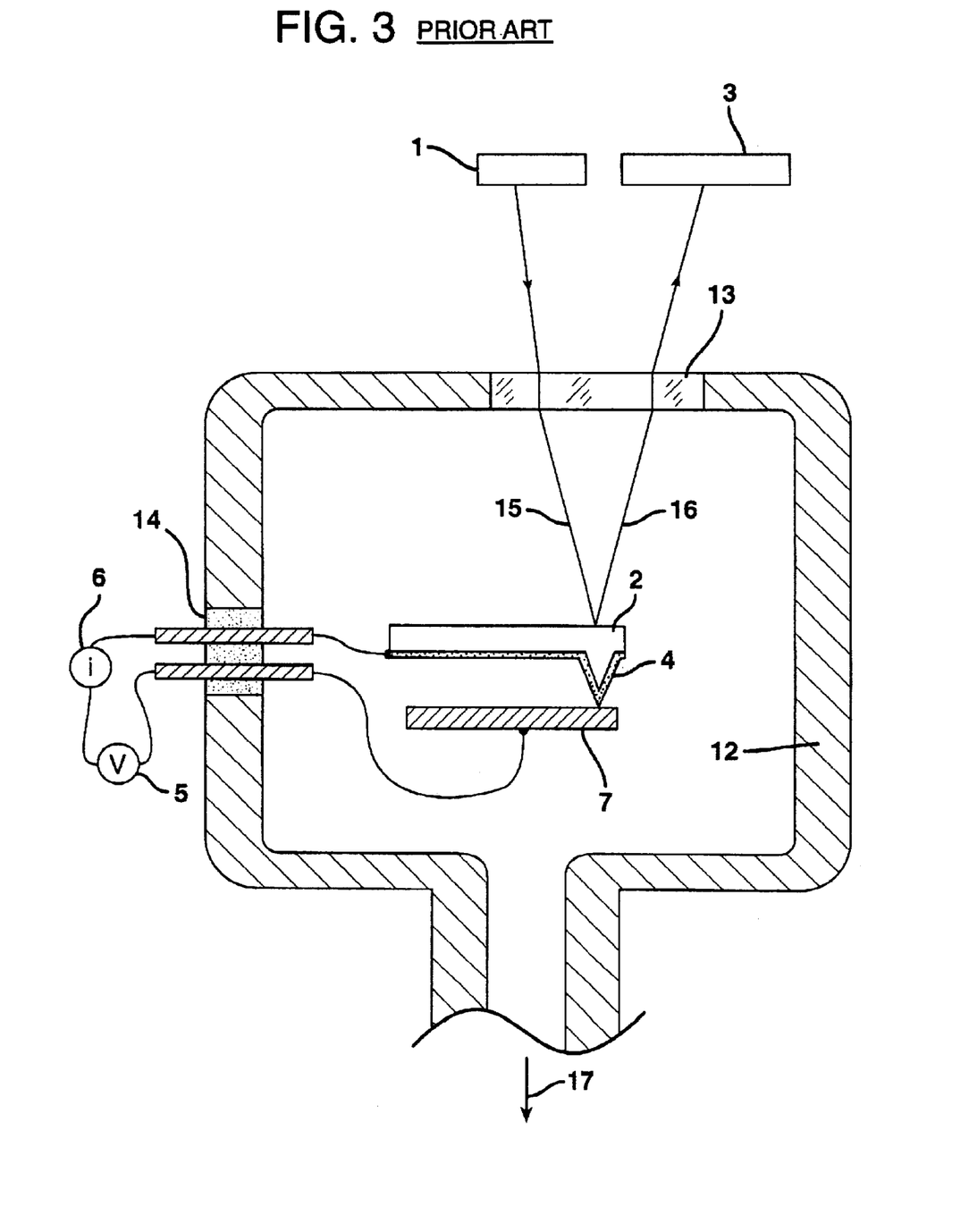
FIG. 3 is a schematic illustration of a conducting scanning probe microscope operated in ultrahigh vacuum according to the prior art.

It has long been recognized that contamination plays a major role in the local conductivity of a surface, as pointed out, for example, by Anselmetti et al, "Combined Scanning Tunneling and Force Microscopy," *J. Vac. Sci. Technol.* B12:1677–1680 (1994). For this reason, some workers have operated conducting-probe microscopes in ultrahigh vacuum. In this arrangement, shown in FIG. 3, the laser 1 and detector 3 may be placed outside an ultra-high vacuum chamber 12 with the optical beams, 15, 16 entering and leaving via a window 13. The cantilever 2 and sample 7 are mounted inside vacuum chamber 12 and connected to a voltage source 5 and current sensor 6 via electrical feedthroughs 14. The entire chamber is evacuated by means of a pumping system 17.

While the use of ultrahigh vacuum can give reproducible results, it is extremely inconvenient to prepare and load samples for this environment. Even more limiting is the fact that certain important samples, such as biological material, cannot survive the vacuum environment. O'Shea et al, "Characterization of Tips for Conducting Atomic Force Microscopy," *Rev. Sci. Instrum.* 66:2508–2512 (1995) have suggested the use of a liquid as a simple means of protecting the sample and tip. Marrian et al, U.S. Pat. No. 5,504,338, have made the same suggestion for the operation of a device using a conducting probe to carry out lithography on a semiconductor surface.

While a liquid covering might well control the presence of water contamination layers that lead to spurious surface conduction, it does not, of itself, permit reliable recording of surface electrical properties. This is because of the inevitable presence of dissolved molecular oxygen which, in the presence of an electric field, is easily reduced to hydrogen peroxide. This process, of itself, gives rise to spurious current through the conducting probe. Even more problematic is the consequent oxidation of molecules and atoms at the sample surface. If this occurs, it results in non-reversible changes in the current-voltage characteristics at the surface because the oxidation changes the properties of the surface.

Furthermore, it is often desirable to examine a surface without a covering liquid in place. For example, in prior art methods in which motion of the cantilever tip is detected, the covering liquid would lead to significant damping of the motion of the tip, resulting in loss of sensitivity. Accordingly, there remains a need in this art for an instrument which can simultaneously acquire electrical and topographical information about a surface, but without the drawbacks and problems of prior art techniques.

SUMMARY OF THE INVENTION

The present invention meets that need by providing a conducting scanning probe microscope in which the atmosphere around the sample is controlled, but is not under vacuum. In this manner, molecular oxygen is eliminated from around the sample, preventing surface oxidation of the sample. Further, the thickness of any adsorbed water layer at the sample surface is controlled by controlling the relative humidity of the atmosphere around the sample, but otherwise the sample is maintained at or near ambient atmospheric pressure.

In accordance with one aspect of the present invention, a scanning probe microscope for measuring the characteristics of a surface of a sample is provided and includes a probe for scanning the surface of a sample to be measured and a sample stage which is adapted to position a sample in the microscope. In a preferred embodiment, the microscope is a conducting atomic force microscope. The microscope also includes a source of voltage in communication with the probe and the sample and a detector for measuring the electrical current to or from the probe and the sample. The probe and the sample are positioned within an enclosure which isolates the probe and the sample from the ambient environment, and the enclosure includes a gas inlet and a gas outlet for controlling the environment in the enclosure to maintain the atmosphere in the enclosure at approximately atmospheric pressure.

Preferably, the enclosure is sealed to enable better control of the atmosphere around the sample. Such control may be accomplished by the inclusion of a source of inert gas (preferably under pressure) communicating with the gas inlet, the inert gas being circulated within the enclosure. However, to insure that molecular oxygen near the sample surface is removed, the microscope includes a trap which is positioned to remove molecular oxygen from gas which enters the gas inlet. Ambient air may be used, but it is not preferred because of the oxygen and moisture it contains.

Optionally, the humidity of the gas within the enclosure may be controlled by a humidity controller which is also in communication with the gas inlet. Preferably, the humidity controller comprises a source of dry gas, a source of gas saturated with water vapor, and a mixer for the gases. Humidity is controlled by controlling the ratio of dry and wet gases entering the enclosure.

Additionally, for those instances where it may be desirable to make measurements using a covering liquid, the scanning probe microscope of the present invention may also optionally include a cell for containing a liquid which is positioned within the enclosure and with the probe and the sample being positioned in the cell.

The present invention also provides a method of operating a conducting scanning probe microscope comprising the steps of providing a sample and a probe sensitive to characteristics of the surface of the sample; applying a voltage to the probe and the sample; and detecting the electrical current to or from the probe or the sample. The detecting step is carried out at substantially atmospheric pressure after molecular oxygen has been displaced from the surface of the sample. Preferably, the sample and probe are positioned in an enclosure which is sealed. A gas inlet and a gas outlet are provided to permit the circulation of gas within the enclosure. In one embodiment, an inert gas )preferably under pressure) is circulated through the enclosure through the gas inlet and the gas outlet to remove molecular oxygen from the area around the sample. In another embodiment, ambient air which has been treated to remove molecular oxygen is circulated through the enclosure.

Optionally, the humidity of the gas is also controlled as described above. Finally, the surface and current measurements may be carried out with the surface of the sample covered by a liquid. In a preferred form the sample and the probe are immersed in a liquid containing cell.

By carrying out the measurements at substantially atmospheric pressure, the expense of high vacuum apparatus is eliminated, and certain sample types, such as biologicals, can be studied. Using a controlled environment, where molecular oxygen is removed from the sample surface prior to operation, oxidation problems are also eliminated. Accordingly, it is a feature of the present invention to provide a conducting scanning probe microscope which can simultaneously acquire electrical and topographical information about a surface, but without the drawbacks and problems of prior art techniques. This, and other features and advantages of the invention, will become apparent from the following detailed description, the accompanying drawings, and the appended claims.

DETAILED DESCRIPTION OF THE PREFERRED EMBODIMENTS

Figure 4:
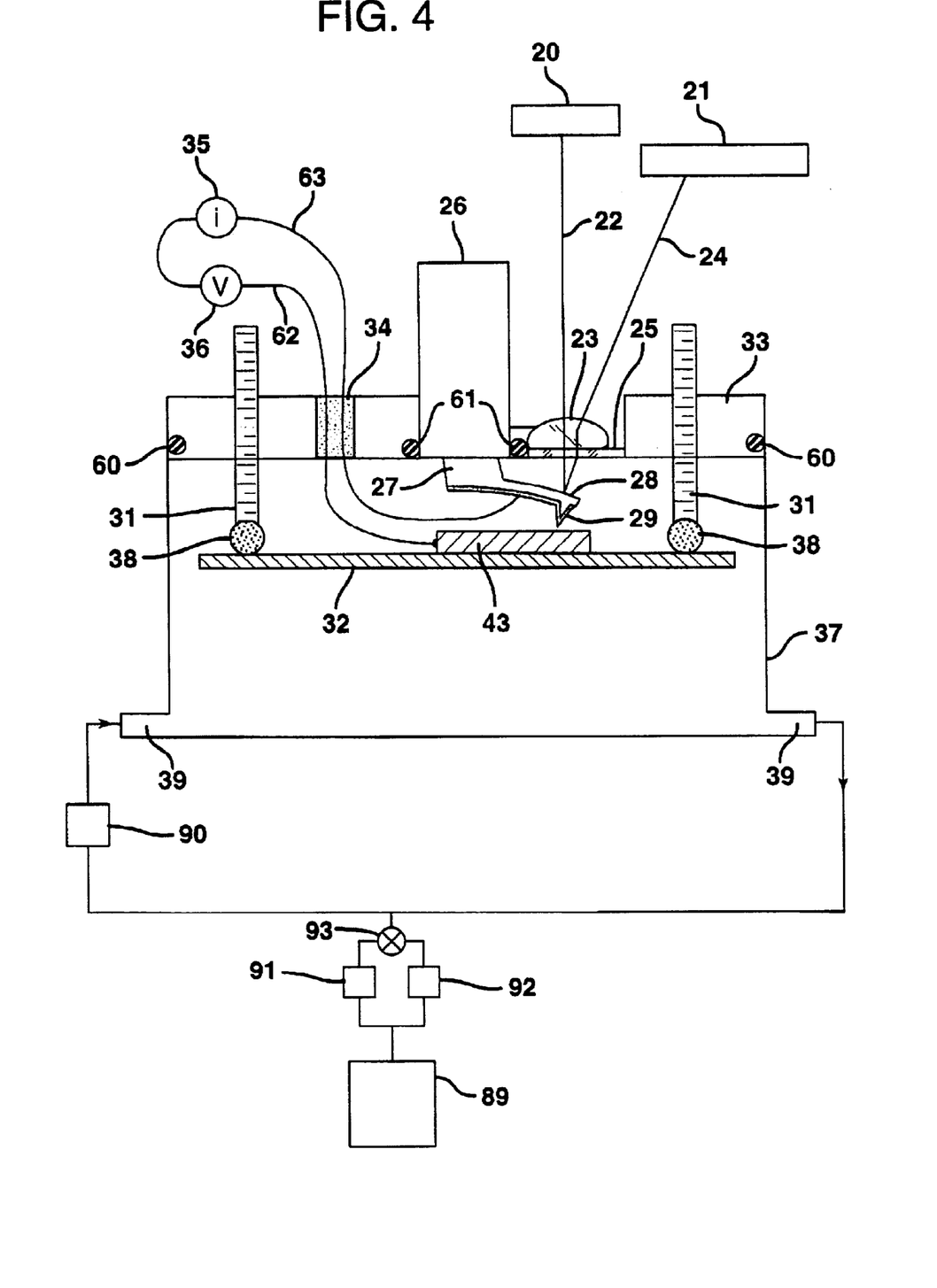
FIG. 4 is a sectional view of the microscope of the present invention.
Figure 5:
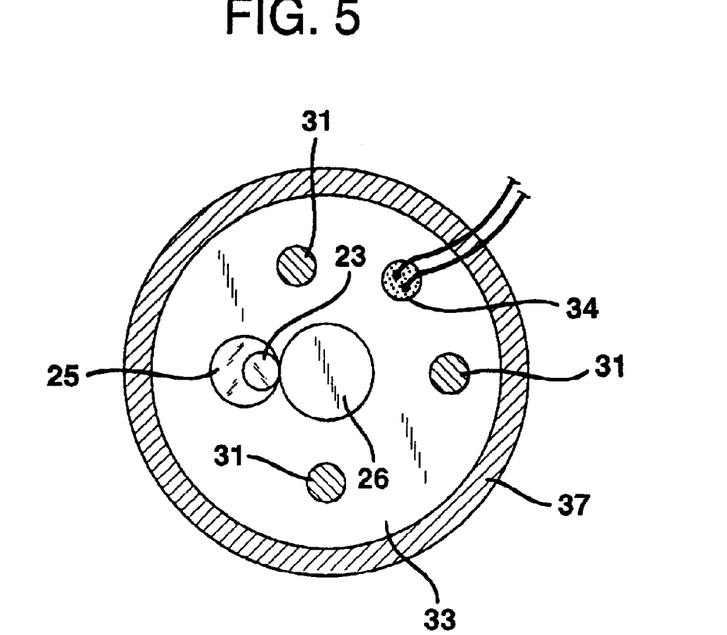
FIG. 5 is a top-down view of the microscope of the present invention.

The present invention is based on our design for a hermetically-sealed scanning probe microscope as described in U.S. Pat. No. 5,675,154, the disclosure of which is hereby incorporated by reference. The microscope of the present invention is shown in a side-view section in FIG. 4 and from a top view in FIG. 5. Referring now to those figures, laser 20 emits a beam 22 which is focused with a lens 23 through a window 25 onto the back of cantilever 28. The reflected beam 24 passes back out of the window 25 onto a position sensitive detector 21. The sample 43 to be examined is positioned on a sample stage such as a magnetic steel disk 32 which is attached to magnetic balls 38 on the end of screws 31 which pass up through sealed threads in the body of the microscope 33. There are three such screws as shown in FIG. 5, but only two are shown in the sectional view of FIG. 4.

The lens 23 and cantilever holder 27 are attached to a scanner 26 which is sealed into the body of the microscope by an O ring 61. The body of the microscope pushes into a sealed chamber 37 and is sealed against the chamber by another O ring 60. Electrical connections are made to a conductive coating on the underside of the cantilever 29 and to the sample 43 and the connecting wires 62, 63 are led out of the sealed chamber through a hermetically sealed connector 34 whence they are connected to a source of voltage 36 and a detector 35 for measuring the current between sample 43 and probe coating 29. Two pipes or conduits 39 are provided and serve as a gas inlet and a gas outlet, respectively, for chamber 37.

Conducting cantilevers may be made from materials such as gold, platinum and titanium which may be sputtered or evaporated onto conventional silicon nitride cantilevers (e.g., Microlevers from Park Scientific of Sunnyvale, Calif.) as taught by O'Shea et al, "Characterization of Tips for Conducting Atomic Force Microscopy," *Rev. Sci. Instrum.* 66:2508–2512 (1995). Optionally, a conducting diamond coating may be used.

In operation, the sample is loaded into the chamber, and a flow of desired gas such as from inert gas source 89 is started. Preferably, the inert gas is under pressure such as, for example, in a pressurized cylinder. The flow is continued until the oxygen level in the chamber 37 falls to a predetermined minimum level. One method for monitoring the level of molecular oxygen comprises placing a liquid cell inside chamber 37 and taking cyclic voltammograms which show an excess current in the presence of dissolved oxygen. Gas flow is maintained throughout the duration of the measurement.

Suitable inert gases are nitrogen, argon and helium. If desired, these gases may be passed through an oxygen scavenging system 90 before being passed into the chamber. A suitable system is the Model 1000 oxygen trap from Chromatography Research Supplies (Addison, Ill.).

Yet another option is to divide the gas flow into two paths, taking one through a desiccant chamber 91 and the other through water 92, and then mixing the wet and dry gasses to obtain a controlled humidity in mixer 93. The humidified gas is then passed into the chamber 37 through inlet tube 39 resulting in a controlled humidity environment inside the chamber.

Figure 6:
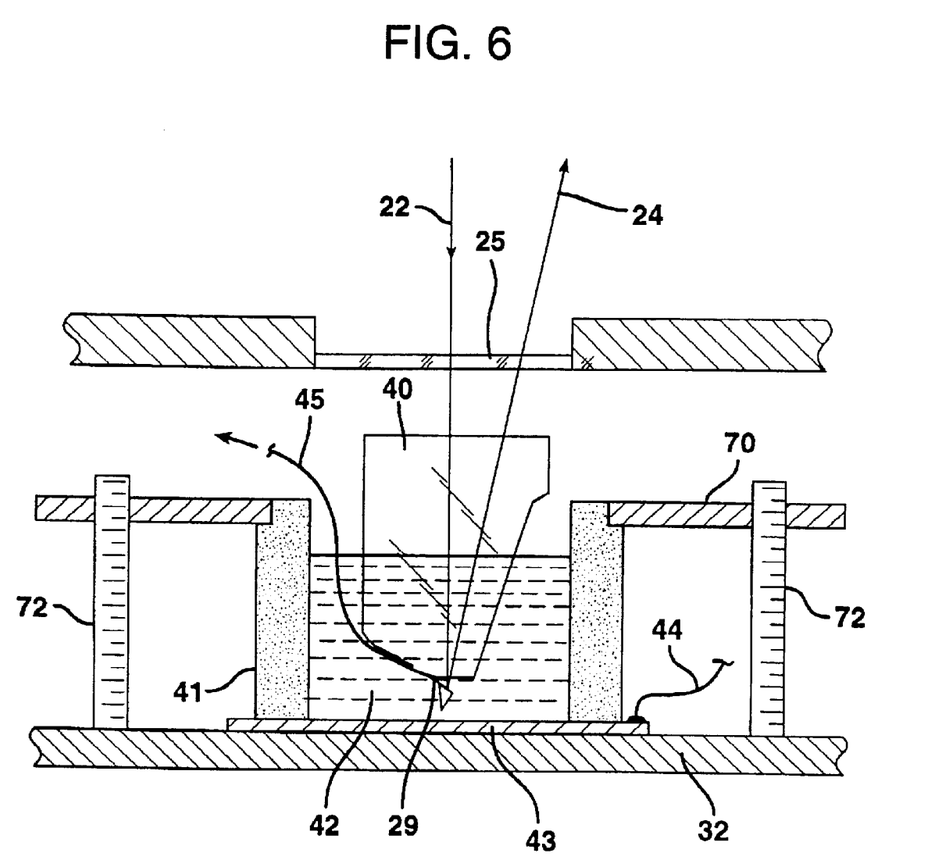
FIG. 6 is a sectional view showing a fluid cell for use with the microscope of the present invention.
Figure 7:
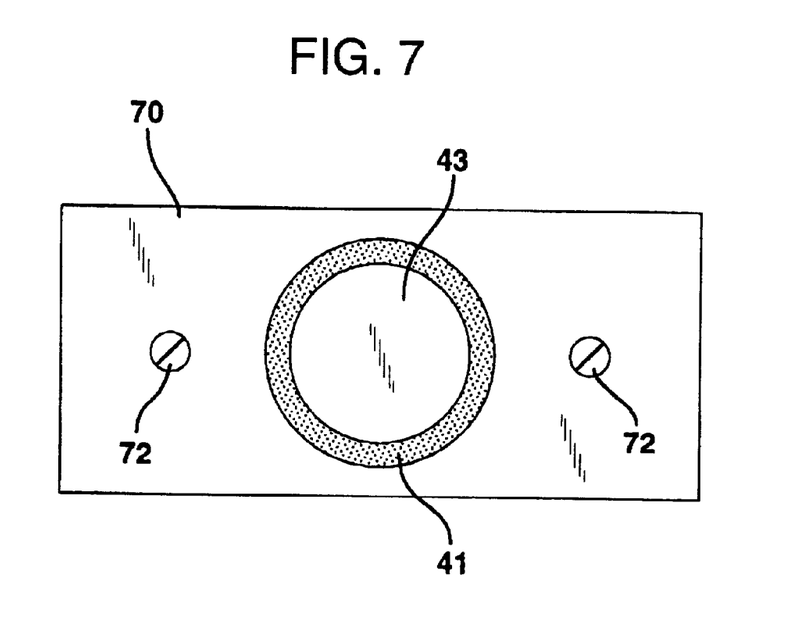
FIG. 7 is a top view showing a fluid cell for use with the microscope of the present invention.

It is sometimes desirable to conduct the surface measurements under a covering liquid. For example, a layer of an insulating liquid such as toluene, mesitylene, or paraffin oil may be placed over the sample to prevent contamination from the ambient environment. However, it is important that this liquid be free of dissolved oxygen. This is easily achieved in the present invention by the placement of a liquid cell on the sample stage 32 as shown in FIGS. 6 and 7. The liquid cell 41 comprises a ring of Teflon®, nylon, Kel-F® or other insulating material pushed down against sample 43 by a clamping plate 70 connected to sample stage 32 by screws 72. The cell is filled with a liquid 42, and probe 29 is lowered into the cell on the end of an optically-transparent cantilever holder 40. The entering 22 and exiting 24 laser beams pass through the window 25. Electrical connections 44, 45 are made to the probe 29 and the sample 43 and are passed out of the hermetically sealed chamber as shown in FIG. 4.

The procedure for ensuring that a liquid is degassed is as follows: The atomic force microscope tip is first used as an electrode in a liquid cell that contains the desired liquid and an inert metal surface such as gold and a reference electrode. The potential difference between the gold surface and the reference electrode is swept from some small positive potential (with respect to the gold) to some small negative potential, and the current through the probe is measured. Dissolved oxygen will generally give rise to an excess current in the negative direction (compared to the positive direction) as molecular oxygen is dissolved. When this current is observed, the flow of inert gas is started and continued until the excess current at negative bias is eliminated. This establishes the procedure that must be used when the same liquid is degassed prior to use in an imaging experiment.

Figure 8:
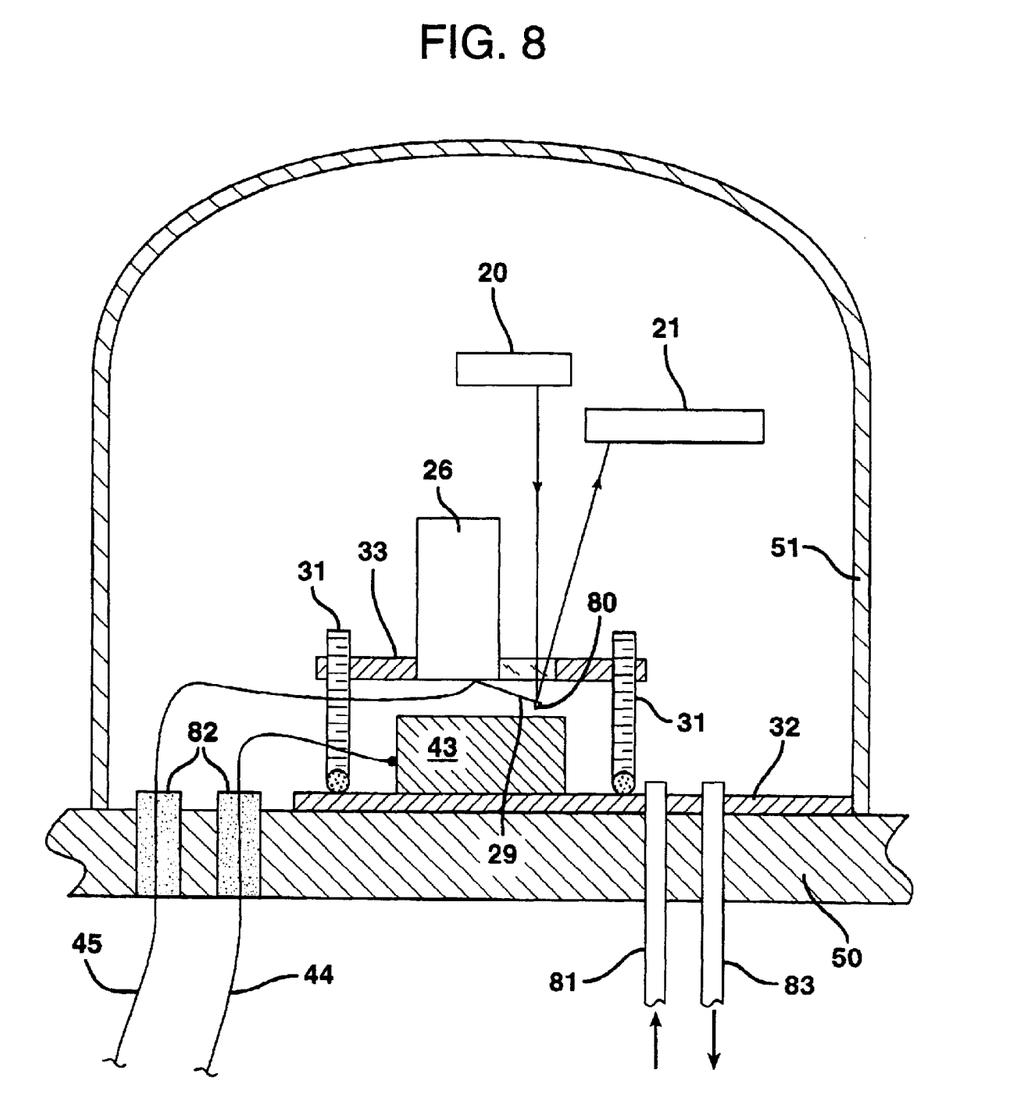
FIG. 8 is a sectional view of another embodiment of the invention in which the entire microscope is placed inside an enclosure.

While the embodiments described above are to be preferred for ease of use of the microscope, other embodiments are also useful. As illustrated in FIG. 8, the entire microscope, consisting of the microscope body 33, the adjustment screws 31, the scanner 26, the conductive probe 80, sample stage 32, sample 44, laser 20 and detector 21 and electrical leads 45 and 44, can all be placed inside a sealed chamber such as a bell jar 51. Electrical connections may be made with sealed connectors 82 and a gas inlet 81 and outlet 82 provided through the base 50 on which the system stands.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A scanning probe microscope for measuring the characteristics of a surface of a sample comprising:
   a probe for scanning the surface of said sample;
   a sample stage adapted to position said sample in said microscope;
   a source of voltage in communication with said probe and said sample;
   a detector for measuring the electrical current to or from said probe and said sample; and
   said probe and said sample being positioned in an enclosure which isolates said probe and said sample from the ambient environment, said enclosure including a gas inlet and a gas outlet for controlling the environment in said enclosure to maintain the atmosphere in said enclosure at approximately atmospheric pressure.

2. A scanning probe microscope as claimed in claim 1 in which said enclosure is sealed.

3. A scanning probe microscope as claimed in claim 1 including a source of inert gas communicating with said gas inlet.

4. A scanning probe microscope as claimed in claim 1 including a trap for removing molecular oxygen from gas entering said gas inlet.

5. A scanning probe microscope as claimed in claim 1 including a humidity controller communicating with said gas inlet.

6. A scanning probe microscope as claimed in claim 5 in which said humidity controller comprises a source of dry gas, a source of gas saturated with water vapor, and a mixer for the gases.

7. A scanning probe microscope as claimed in claim 1 further including a cell for containing a liquid positioned within said enclosure, said probe and said sample being positioned in said cell.

8. A method of operating a conducting scanning probe microscope comprising the steps of:
   providing a sample and a probe sensitive to characteristics of the surface of said sample;
   applying a voltage to said probe and said sample; and
   detecting the electrical current to or from said probe or said sample; the detecting step being carried out at substantially atmospheric pressure after molecular oxygen has been displaced from the surface of said sample.

9. A method as claimed in claim 8 in which said sample and said probe are positioned in an enclosure.

10. A method as claimed in claim 9 in which said enclosure is sealed.

11. A method as claimed in claim 10 in which said enclosure includes a gas inlet and a gas outlet.

12. A method as claimed in claim 11 in which an inert gas is circulated through said enclosure through said gas inlet and said gas outlet.

13. A method as claimed in claim 11 in which gas circulated through said enclosure has been treated to remove molecular oxygen.

14. A method as claimed in claim 12 in which the humidity of the gas is controlled.

15. A method as claimed in claim 13 in which the humidity of the gas is controlled.

16. A method as claimed in claim 8 including the step of covering the surface of said sample with a liquid.

17. A method as claimed in claim 16 in which said sample and said probe are immersed in a liquid containing cell.

* * * * *